J. W. CONWAY.
Car Propeller.
No. 57,623. Patented Aug. 28, 1866.
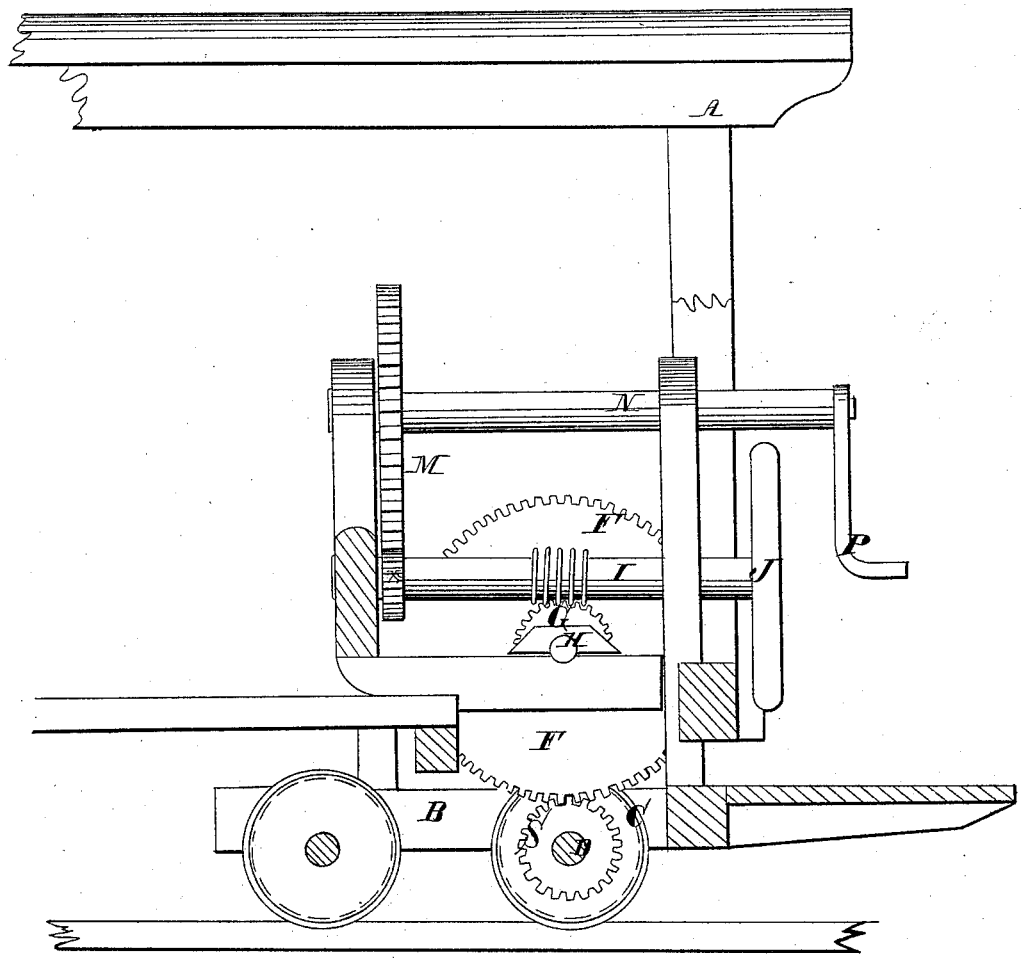
Witnesses
Wm Frank
Thomas T Parker
Inventor,
J W Conway,
By his atty,
J S Brown

UNITED STATES PATENT OFFICE.

J. W. CONWAY, OF MADISON, INDIANA, ASSIGNOR TO HIMSELF AND WILLIAM CONWAY.

IMPROVED METHOD OF PROPELLING STREET-CARS.

Specification forming part of Letters Patent No. 57,623, dated August 28, 1866.

*To all whom it may concern:*

Be it known that I, J. W. CONWAY, of Madison, in the county of Jefferson and State of Indiana, have invented a new and Improved Hand Propelling-Power for Carriages or Street-Railway Cars; and I do hereby declare that the following is a full and exact description thereof, reference being had to the accompanying drawing, representing its application to a street-railway car.

My invention consists in the employment of an endless screw in connection with the operative gearing of the car, so that not only is the motion produced thereby, but it serves as a brake to stop the car almost immediately on stopping the power, substantially as hereinafter set forth.

In the drawing, the screw I acts upon the cog-wheel G, constituting therewith an endless screw, as known in mechanics. On the shaft H of the wheel G another cog-wheel, F, is attached, and gears into a pinion, E, on the axle D of one pair of wheels of the truck or car. This gearing, in connection with the driving-wheel M on the shaft N of the crank P, gearing into a pinion, L, on the shaft of the screw I, determines the proper speed of the car with a suitable rate of turning the crank P. I propose to use one, two, or more cranks, to be turned by as many men, for propelling the car, and the employment of the endless screw enables one or two men to move the car at a velocity proportionate to their strength—the less the slower the speed, and vice versa; and it is equally practicable by this means to use small power and slow motion or greater power and faster motion; and this endless screw continually locks the car wherever it is—when its motion stops the car stops—so that no brake is required, and the car can go up or down any practicable grade with ease and safety. It is also about as easy to start as to continue the motion.

I attach a fly-wheel, J, to the shaft of the screw. This not only renders the motion more uniform, but serves a peculiar purpose in this connection—namely, to protect the gearing from the effects of a too sudden stopping of the motion when the car is moving with some speed, so that the momentum shall not tear off the cogs of the wheels or threads of the screw. This wheel continues the revolution of the screw a few turns till the momentum has been checked.

With this invention I propose to make the propulsion of street-cars by hand practicable, convenient, and economical in many instances.

What I claim as my invention, and desire to secure by Letters Patent, is—

The endless screw I G, in combination with the driving or crank shaft N and the axle D of one pair of the wheels of a carriage or car, substantially as and for the purpose herein specified.

The above specification of my improved hand-propeller (or power) for running street-railway cars or carriages signed by me this 21st day of May, 1866.

J. W. CONWAY, M. D.

Witnesses:
 T. C. VANNINGS,
 S. C. STEVENS.